United States Patent [19]

Kopacz et al.

[11] Patent Number: 4,540,368
[45] Date of Patent: Sep. 10, 1985

[54] EDUCATIONAL VISUAL APPARATUS

[76] Inventors: Robert F. Kopacz, c/o Hamill Studios, 345 Centre St.; Timothy Hamill, 345 Centre St., both of Milton, Mass. 02186

[21] Appl. No.: 551,355

[22] Filed: Nov. 14, 1983

Related U.S. Application Data

[63] Continuation-in-part of Ser. No. 319,214, Nov. 9, 1981, abandoned.

[51] Int. Cl.³ .............................................. G09B 23/00
[52] U.S. Cl. ...................................... 434/276; 40/408; 434/303
[58] Field of Search ................... 40/407, 408; 46/6, 7, 46/8; 119/5; 354/292; 434/126, 276, 283, 290, 300, 303; 446/15, 16, 17

[56] References Cited

U.S. PATENT DOCUMENTS

| | | | |
|---|---|---|---|
| 1,048,801 | 12/1912 | Boys | 434/283 |
| 1,974,068 | 9/1934 | Greensaft | 119/5 |
| 2,550,805 | 5/1951 | Greenfield | 434/290 |
| 3,142,908 | 8/1964 | Annis | 434/126 |
| 3,324,573 | 6/1967 | Lavallee | 434/300 |
| 3,613,264 | 10/1971 | Vitka | 434/126 |
| 3,874,336 | 4/1975 | Murphy | 119/5 |
| 4,133,124 | 1/1979 | Chang | 40/408 |
| 4,152,864 | 5/1979 | Habisohn | 46/6 |
| 4,205,481 | 6/1980 | Tomson | 46/6 |
| 4,236,795 | 12/1980 | Kephart | 354/292 |
| 4,257,185 | 3/1981 | Tomson | 46/6 |

OTHER PUBLICATIONS

"Ripple Tank Complete", p. 24 of the Project Physics Course, Catalog from Holt, Reinhart and Winston, 9/1972.

*Primary Examiner*—Harland S. Skogquist
*Attorney, Agent, or Firm*—Jerry Cohen; William E. Noonan

[57] ABSTRACT

Optical device comprising a base (14), transparent side wall (12A) and soap bubble (18) formation in arrangement, together with a light source, for viewing light from a source refracted from the bubble and which is supported as an arc from the base and side wall.

6 Claims, 6 Drawing Figures

EDUCATIONAL VISUAL APPARATUS

BACKGROUND OF THE INVENTION

This application is a continuation-in-part of Ser. No. 319,214, filed Nov. 9, 1981 abandoned.

This invention relates to devices for observing light dispersion and reflection effects on the surface of soap films.

The present invention affords the enhanced observing and photographing of the layering effect of light dispersed into its component wavelengths on the surface of tensioned films, typically of the bubble film variety.

Most devices created thus far have concerned themselves only with the formation of bubbles via novel methods and in novel shapes, but none have sought to perfect the visual presentation, allowing for high quality recording and reproduction of surface effects, by solving the problems of internal reflections inside the bubble.

Under normal ambient conditions with which presently available bubble forming devices have concerned themselves only, light is dispersed homogeneously in intensity via reflection off surrounding objects. In such homogeneous surroundings, the intensity of light striking any particular surface of a bubble film is essentially the same for all surfaces making it difficult if not impossible to observe the dispersive spectral phenomena occurring on the surfaces of a bubble film.

In one device of the prior art, Chang et al, U.S. Pat. No. 4,133,124, a bubble is formed on the bottom of a tray and light from a light source located beneath the tray is reflected from the inside surface of the bubble so that interference patterns are created. However, optimal viewing and photographic effects are not provided. As Chang itself recognizes, multiple internal reflections are produced within the bubble. Further, the interior of the bubble must be viewed through a bubble surface which is constantly moving and changing in thickness. Therefore, blurred and distorted images often result and consistently clear and sharp photographs are unattainable.

SUMMARY OF THE INVENTION

It is the object of this invention to provide a device which is capable of eliminating the distracting internal reflections, both for spectator viewing and for specialized photographic situations and requirements.

This invention results from a realization that the internal reflections and distortions inherent in a concave spherical surface of a tensioned soap film or bubble can be eliminated only by placing the viewer optically "within" the bubble or by condensing the bubble to a shape that, relating to viewing distance, no longer has multiple reflections.

This invention features a tensioned film observing device including a supporting structure which includes a transparent substantially planar base having at least one transparent wall mounted and extending vertically from the base preferably at an acute angle for supporting tensioned films of variable size and shapes and means for illuminating the inner surface of a tensioned film.

The base is typically composed of silicate glasses or polished plastics. The tensioned film includes a liquid substance including a light dispersing agent. Typically the tensioned films are created by blowing into the liquid substance through a hollow tube thereby creating a bubble film or similar tensioned film. Blowing onto the surface of an already formed bubble creates vortex patterns of the light dispersing agent on the surface of the film.

The means for illuminating the inner surface include a source of any combination of visible light wavelengths which is typically white light. The light may be disposed below the film or may be located above the film and reflecting means provided to light the inner film surface. The device may also include a means for aligning the light rays from the source of light substantially parallel to each other prior to their striking the single source of the tensioned film adjacent the light source.

A liquid substance typically used in this invention is a solution of soap and water. The soaps typically employed are a mixture of straight chain fatty acids which are five to thirteen carbon atoms in length. Other substances which may be utilized to achieve the spectral effects of this invention include glycerine, ammonia, sugar molecules of the corn syrup variety, photoflo and various other detergents. These materials may be included in the liquid substance prior to adding it to the tray or may be applied to an already formed film such as by spraying or misting. By using these various materials and mixtures thereof, varying the composition and concentration of the liquid substance, a wide variety of layering effects and the spectral effects phenomena associated therewith may be observed and/or photographed. For example, the layers of light dispersing agent and the spectral patterns thereof, may be blurred or stratified; film thickness and/or the rate of change of thickness may be altered; the life of the tensioned film may be prolonged or shortened; surface tension and the velocity of surface movement may be varied and the time required for larger stratification in newly formed film may be changed. This invention permits investigation and observation of these phenomena.

It is preferred that a transparent wall portion forms an angle of at least 75 degrees but less than 90 degrees with said base. Observation and photography of thin film spectral patterns is thus enhanced. This wall provides an accommodating surface for at least a portion of a tensioned film. The wall may also be curved convexly toward the observer. In this embodiment, a layered spectral pattern of light is formed on at least the single surface of the tensioned film adjacent the source of light and is visible through each transparent wall portion accommodating the tensioned film. In such an embodiment, a similarly mounted opaque wall will typically be disposed on the opposite side of the tray to provide a background against which the spectral pattern may be observed and/or photographed.

DETAILED DESCRIPTION OF PREFERRED EMBODIMENTS

Figure 1:
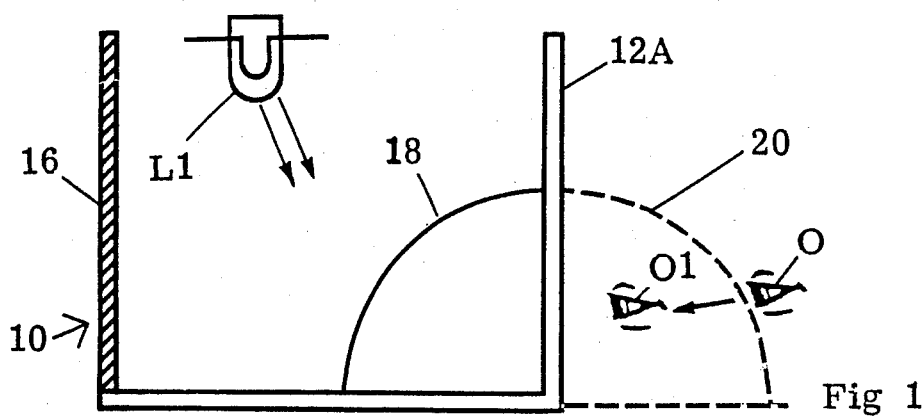
FIG. 1 is a cross-sectional view through a basic embodiment of the invention.

As shown in FIG. 1, a first embodiment device 10 employs a transparent, vertical plane 12A, attached to transparent base 14 and an opaque back wall 16, also attached to the base, to make possible the viewing and recording of light dispersion and reflection patterns on tensioned soap films 18 without the previously unavoidable internal reflections and distortions.

A light source L is disposed beneath base 14 and the light therefrom is reflected and dispersed from the soap film or bubble 18, typically creating a spectral pattern which may be observed by observer O. Alternatively, one or more light sources L1 may be situated above the film. Light from L1 is reflected from a diffusive and reflective surface* M onto the surface of bubble 18. A pair of light sources L1 may be used, each being positioned above and to the side of device 10.

* white or metallized paper, sheet, etc. but not a mirror.

In its simplest embodiment, (FIG. 1) the plane 12A can be vertical, allowing a viewer to step within the implied area of the bubble (dotted line 20), e.g. the observer effectively moves from O to O1. By slanting the transparent plane 12B (FIG. 2) backwards 5-10%, the viewer can view or photograph the bubble 18 from any distance, still without any internal reflections from top to bottom. For elimination of all internal reflections (right and left corners as well) the transparent plane 12C (FIG. 3) must be curved gently backwards on the sides as well.

Figure 4:
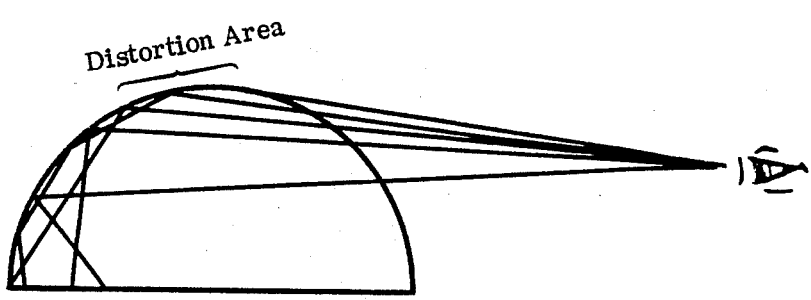
FIG. 4 shows a bubble observed by a viewer not using this device, showing an area distorted by internal reflections.

The existing "state of the art" from U.S. Pat. No. 4,133,124 Chang (his FIG. 4 and column 3, lines 55-59) depicts the internal reflections and acknowledges them, with no hint of the desirability or possibility of eliminating them, but accepts them as a fact of optics. The internal reflections cancel but a major and important area for viewing and aesthetically disrupt an inherently visual experience. The internal reflections cannot be eliminated from any angle or point of view on this or other existing devices. See FIG. 4 and the distortion area thereof illustrating the point.

Figure 5:
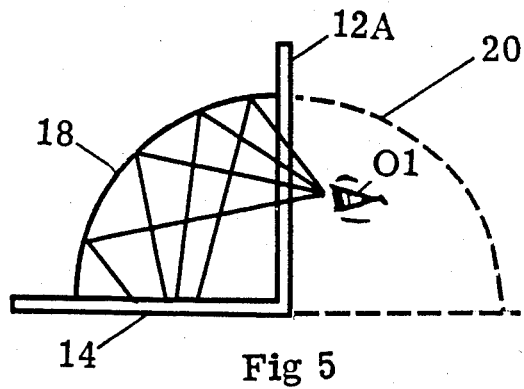
FIG. 5. shows the device of FIG. 1, with a viewer getting no internal reflections, by moving "within" the area of a bubble (dotted line)

Placing our vertical, transparent plane 12A, bisecting the bubble hemisphere, can eliminate these internal reflections. The viewer O1 can move forward, now, within the implied area of the bubble (dotted line 20, FIG. 5) if it were not bisected. From this vantage point all internal reflections are eliminated. There is an increase in visual impact also, be being "within" the bubble, surrounded by an almost 180 degree range of the inside surface of the bubble. Although hard to quantify objectively, it does provide a vastly improved experience, in range of vision and in size and area potential. A bubble of a given depth will have twice the height and width and four times the area as one not created on our device.

Figure 6:
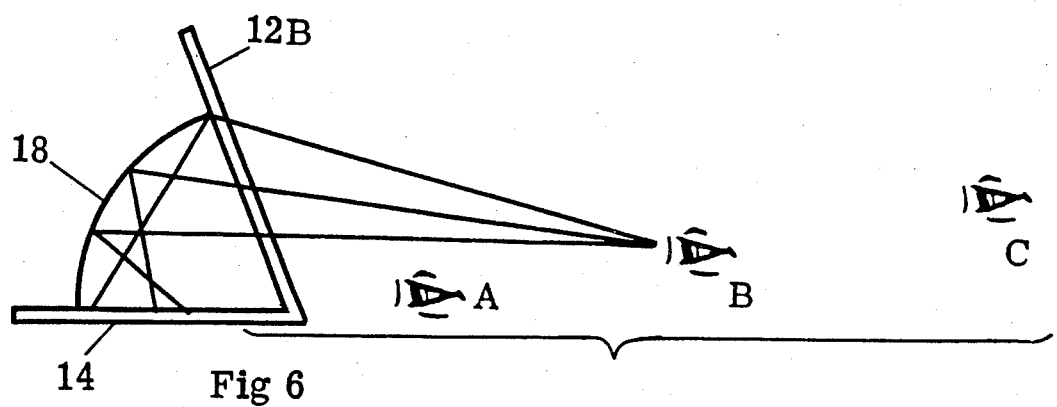
FIG. 6 shows the device of FIG. 2, with a viewer (or camera) "outside" of bubble and still getting no internal reflections.

For recording (photography, film, video, etc.) bubble information without internal reflections the slanted transparent plane 12B embodiment is necessary. Limitations and differences in cameras and lenses, with problems of focus, depth-of-field, and range of vision to consider, will require the lens and camera to be outside the "implied"0 area of the bubble in order to see the edge(s) of it, rather than just surface detail. By slanting the front transparent plane 12B backwards (FIG. 6), the internal reflections are eliminated. The slant necessary will vary from 0-10 degrees depending on the distance and height of the viewer or camera lens relative to the bubble 18. Closer in and lower down makes less of an angle necessary; moving from A-B-C would require increasing the angle. The quality of image and the elimination of the internal reflections are critical and directly related to each other.

The slanting back of the plane 12B eliminates most of the internal reflections, all of those through a central, vertical section. To record the entire bubble hemisphere, with no distortions in the outer left and right lower corners, the front plane 12C must curve backwards (corner relative to the observer/photographer) as in FIG. 3 to solve the optical problems there as the slant does on the vertical axis.

Figure 2:
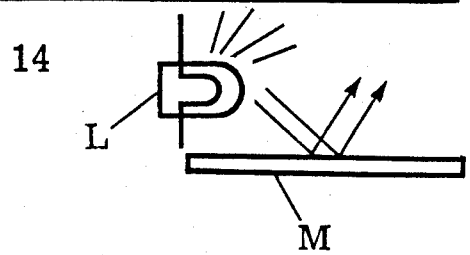
FIG. 2 is a cross-sectional view through an embodiment using a slanted transparent wall.
Figure 2:
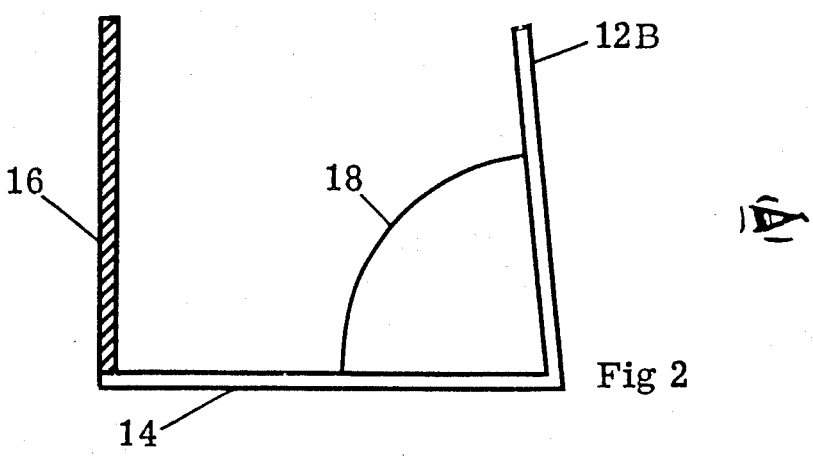
Figure 3:
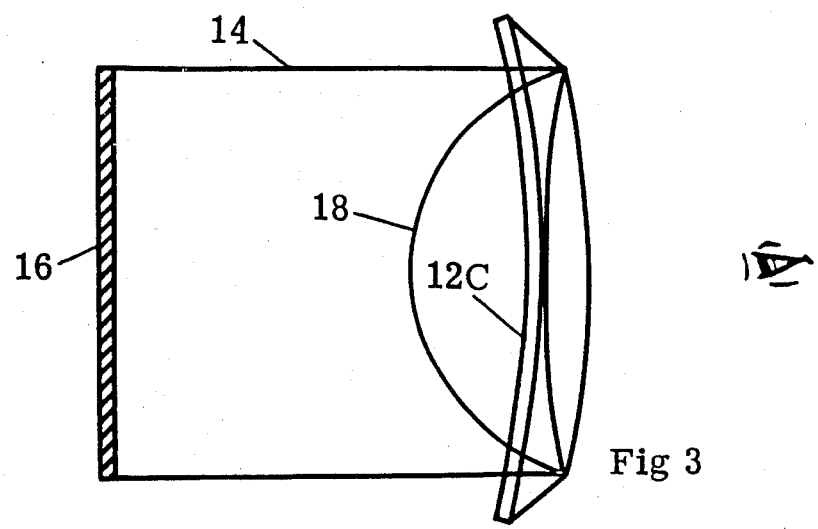
FIG. 3 is a cross-sectional view through an embodiment using a curved transparent wall, seen from above.

Each of the three embodiments has its function, that in FIG. 1 for getting the viewer "within" the bubble, and eliminating distortions; the ones in FIGS. 2 and 3 for viewing or recording from "outside" the bubble, still eliminating the internal reflections.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A device for observing and photographing tensioned films which include a liquid substance containing a light dispersing agent comprising a supportive structure including a substantially planar base which is transparent to all wave lengths of visible light and at least one wall portion, which is transparent to all wave lengths of visible light and mounted to extend upwardly from said base and slanted relative to said base at an acute angle for supporting tensioned films of variable sizes and shapes on both said base and at least one said transparent wall portion, and means for illuminating the inner surface of the tensioned film including means defining a source of visible light wave lengths for forming a layered spectral pattern of light on the inner surface of the film which is visible through said transparent wall portion.

2. The device of claim 1 further including at least one wall portion which is opaque to all wave lengths of visible light and which is mounted to extend upwardly from said base to provide a background against which the layered spectral patterns formed on tensioned film and which are accomodated, at least in part, by said transparent wall portion can be observed.

3. The device of claim 1 in which said light source is disposed below said tensioned film.

4. The device of claim 1 wherein said transparent wall is slanted 0-10 degrees.

5. The device of claim 1 in which said transparent wall is curved convexly toward the observer.

6. The device of claim 1 in which said light source is disposed above said tensioned film and light therefrom is reflected onto said inner surface of said film.

* * * * *